United States Patent
Tanaka et al.

[11] Patent Number: 5,991,313
[45] Date of Patent: Nov. 23, 1999

[54] VIDEO TRANSMISSION APPARATUS

[75] Inventors: Hiroshi Tanaka; Masaru Kawazoe; Fumito Shimamura; Ryoichi Honma; Kazuma Sato, all of Tsurugashima, Japan

[73] Assignee: Toko, Inc., Japan

[21] Appl. No.: 08/833,339

[22] Filed: Apr. 4, 1997

[30] Foreign Application Priority Data

May 24, 1996 [JP] Japan .................................. 8-152953

[51] Int. Cl.$^6$ .............................. H04J 3/02; H04H 1/00; H04N 7/14
[52] U.S. Cl. ...................... 370/537; 370/474; 370/473; 455/4.2; 455/3.2; 348/13
[58] Field of Search .................................. 370/535, 538, 370/543, 522, 490, 493, 537, 542, 474, 468, 204; 348/7, 13; 455/3.2, 4.2, 5.1

[56] References Cited

U.S. PATENT DOCUMENTS

| | | | |
|---|---|---|---|
| 5,084,903 | 1/1992 | McNamara et al. | 370/204 |
| 5,410,343 | 4/1995 | Coddington et al. | 455/4.2 |
| 5,539,449 | 7/1996 | Blahut et al. | 455/4.2 |
| 5,640,673 | 6/1997 | Tanabe | 455/3.2 |

*Primary Examiner*—Hassan Kizou
*Assistant Examiner*—John Pezzlo
*Attorney, Agent, or Firm*—Londa and Traub LLP

[57] ABSTRACT

A video transmission apparatus comprises video codec for compression-encoding video data to be transmitted and decompression-decoding video data as received; a first audio codec for compression-encoding first audio data to be transmitted and decompression-decoding first audio data as received; a second audio codec for compression-encoding second audio data to be transmitted and decompression-decoding second audio data as received; a multiplexer-demultiplexer for including a three-channel buffer memory and processor; and an interface connectable to communications satellite network and ground network. In the multiplexer-demultiplexer, video data-first audio data and second audio data to be transmitted are multiplexed and converted to a packet based on a predetermined communication format, and packet as received is separated into video data-first audio data, and second audio data.

2 Claims, 5 Drawing Sheets

VIDEO TRANSMISSION APPARATUS

BACKGROUND OF THE INVENTION

1. Field of the Invention

The present invention relates to a video transmission apparatus which is capable of transmitting video signals, even from an isolated island or a remote place where no communication network is provided, through use of communication satellite lines.

2. Description of the Prior Art

With analog inmarsat A network, full duplex lines have been established with a transmission rate of 4800 bps between mobile earth station and land earth station for both forward channel and backward channel, thereby achieving telephone function. In addition, HSD (High Speed Data) service with an increased transmission rate of 64 Kbps for the forward channel has also been available. Video transmitting apparatus using such a service has been employed for the purposes of collecting news at an isolated island or a remote place through use of communications satellite. With the conventional apparatus, it has been the practice that when it is attempted to transmit video material via the 64 Kbps forward channel of the A network, the transmitting station makes a previous arrangement with the receiving station by using the telephone function, confirms that the receiving station is ready for reception; then switches the apparatus to the HSD service mode; and transmits video data either in real-time mode or storage mode, in a one-way fashion.

In the real-time mode, detection of transmission error at the receiving station is effected by performing real-time correction process at the receiving station without using the backward channel; thus, the telephone function can be retained for the backward channel.

In the storage mode, on the other hand, the telephone function is not available since the backward channel is occupied for the receiving station to detect transmission error in video transmission for each data block and send the result of the detection to the transmitting station. Furthermore, the switching of the apparatus to the telephone mode cannot be effected at the receiving station, and thus inconveniently no means for transmitting information is available at the receiving station.

SUMMARY OF THE INVENTION

Accordingly, it is an object of the present invention to provide a video transmission apparatus equipped with functions of transmitter-receiver and arranged to effect inputting and outputting of image data consisting of video data and first audio data, and second audio data for realizing telephone function, the improvement comprising a video codec for compression-encoding video data to be transmitted and decompression-decoding video data as received; a first audio codec for compression-encoding first audio data to be transmitted and decompression-decoding first audio data as received; a second audio codec for compression-encoding second audio data to be transmitted and decompression-decoding second audio data as received; a multiplexer-demultiplexer for including a three-channel buffer memory and processor; and an interface connectable to communications satellite network and ground network, wherein in the multiplexer-demultiplexer, video data-first audio data and second audio data to be transmitted are multiplexed and converted to a packet based on a predetermined communication format, and packet as received is separated into video data-first audio data, and second audio data.

As will be appreciated, according to the present invention, the design is made such that during video data transmission, telephone transmission or general-purpose data transmission is possible with a transmit-receive type video transmitter capable of transmitting image data through use of communications satellite network.

Other objects, features and advantages of the present invention will become apparent from the ensuing description taken in conjunction with the accompanying drawings.

DESCRIPTION OF THE PREFERRED EMBODIMENTS

Digital inmarsat B network service has recently been started which constitutes HSD service wherein the transmission rate for both of the forward and backward channels is 64 Kbps. The present invention has been developed to cope with the increase in transmission capacity of backward channel.

Figure 1:
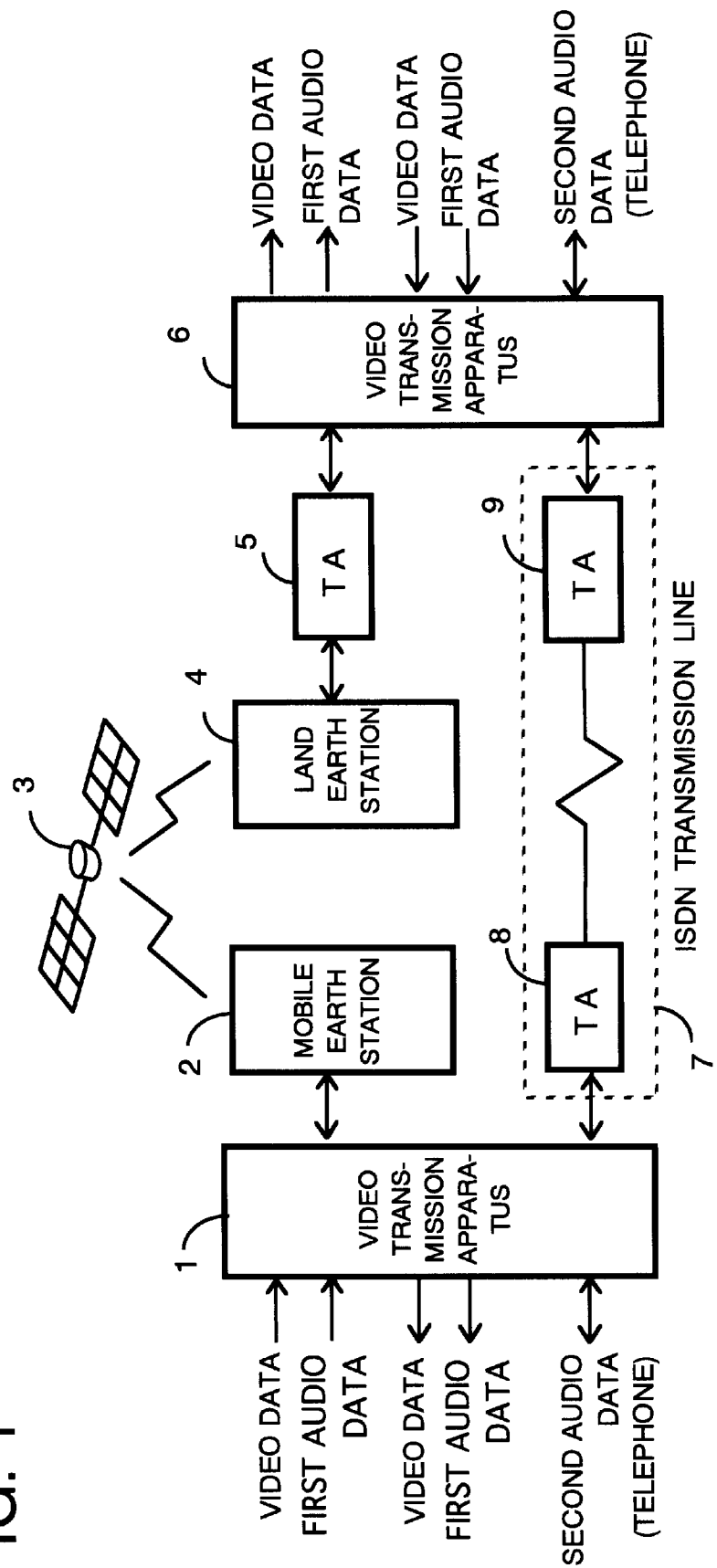
FIG. 1 is a schematic view illustrating the manner in which the video transmission apparatus according to the present invention is used.

FIG. 1 illustrates the manner in which the video transmission apparatus is used. The video transmission apparatus 1 at the mobile earth station and video transmission apparatus 6 at the land earth station are both equipped with the functions of transmitter-receiver, thereby inputting and outputting picture data consisting of video data and first audio data, and second audio data for telephone.

The video transmission apparatuses 1 and 6 are arranged to transmit and receive picture data and second audio data via mobile earth station 2, communication satellite 3, land earth station 4, and terminal adapter 5. Further, in an area where ISDN transmission line 7 is available, the video transmitters 1 and 6 are capable of transmitting data via ground line of the ISDN transmission line 7. Indicated at 8 and 9 in the drawings are terminal adapters provided at the terminals of the ISDN transmission line 7.

Figure 2:
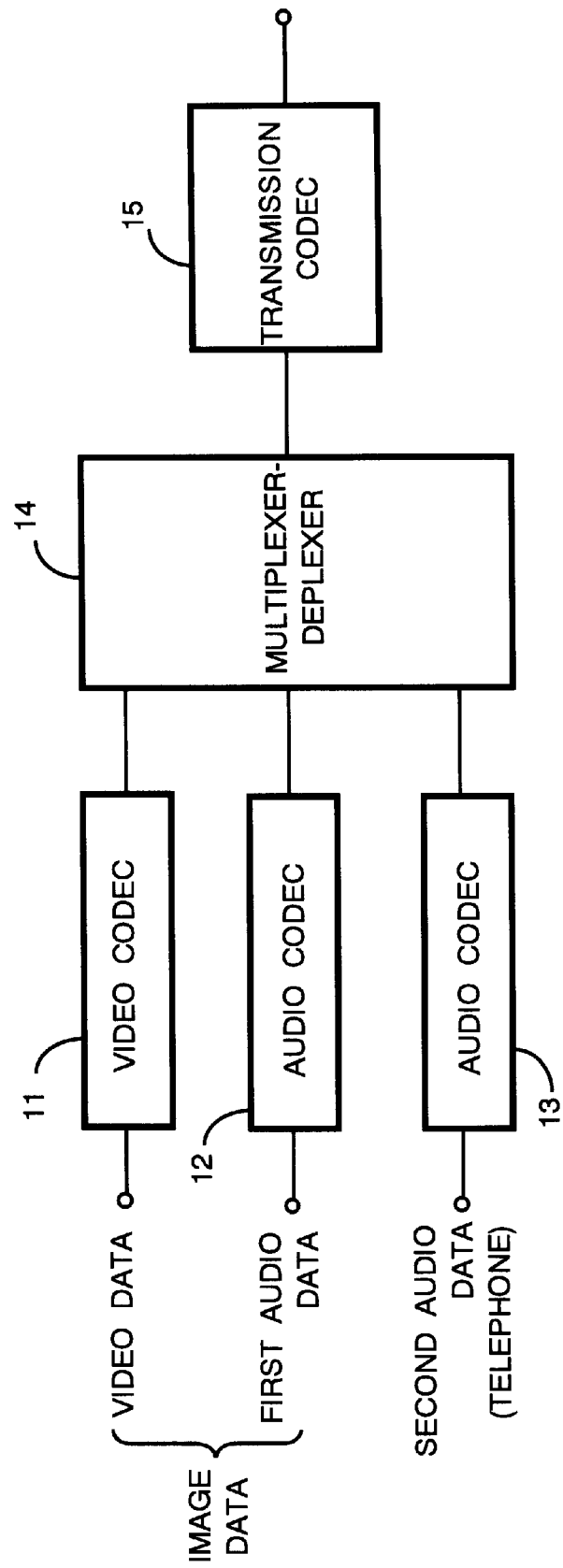
FIG. 2 is a block diagram showing the construction of the inventive video transmission apparatus.

FIG. 2 is a block diagram schematically showing the construction of the video transmitter. Video codec 11 is arranged to effect compression-encoding of video data to be transmitted, and decompression-decoding of video data as received. Audio codec 12 is arranged to effect compression-encoding of first audio data to be transmitted, and decompression-decoding of first audio data as received. Furthermore, another audio codec 13 is arranged to effect compression-encoding of second audio data to be transmitted, and decompression-decoding of second audio data as received. Multiplexer-demultiplexer 14 is equipped with a three-channel buffer memory and processor.

The respective data to be transmitted which have been compression-encoded at the video codec 11, audio codec 12 and audio codec 13, are multiplexed at the multiplexer-demultiplexer 14 and then converted to packet consisting of binary bit string corresponding to a predetermined communication format. Those data will be transmitted after having been subjected to error correction coding of binary bit string at transmission codec 15. The error correcting procedure uses the BCH code in the real-time transmission mode, and the HDLC protocol in the storage transmission mode. Data as received in the form of packet is subjected to identification of data portion therefrom at the transmission codec 15, and then separated into the video data and first audio data and the second audio data at the multiplexer-demultiplexer 14, which are subsequently applied to the video codec 11 and audio codec 12 and the telephone codec 13, respectively, so as to be subjected to decompression-decoding.

Figure 3:
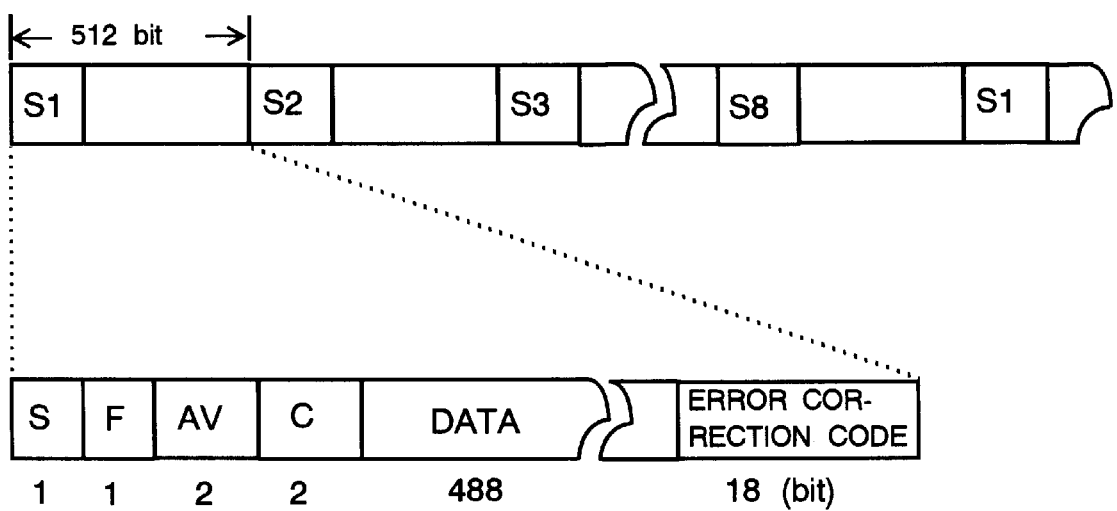
FIG. 3 is a view showing an example of communication format.

Referring to FIG. 3, there is shown an example of communication format wherein a multi-frame is constituted by eight frames each consisting of 512 bits. The lower portion of FIG. 3 represents the internal arrangement of one such frame, wherein S is cyclic bit which is cyclically repeated from S1 to S8; F is fill bit for enabling data to be supplied without interruption for entire effective transmission clock; AV is flag bit for distinguishing between the video and first audio data and the second audio data; and C is general option bit which is used for controlling display of communication state or for other purposes.

Figure 4:
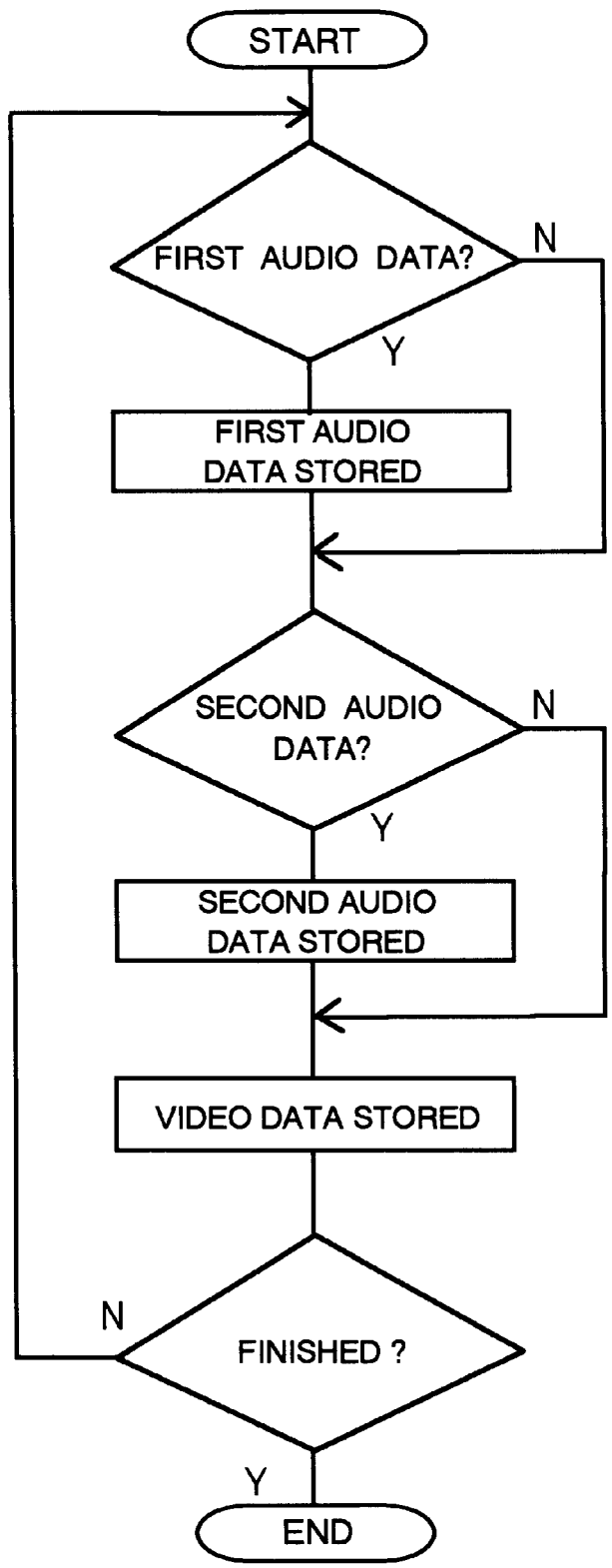
FIG. 4 is a flow chart showing the order of priority of stored data.

One bit is assigned to each of the S and F, and two bits are assigned to each of the AV And C; and data of 488 bits and error correction code of 18 bits are assigned after the C. The video data and first audio data and the second audio data, which constitute the data portion, are stored in the multiplexer-demultiplexer in the priority order of the first audio data, second audio data and video data, and then successively transferred to the transmission codec 15, as shown in FIG. 4.

Figure 5:
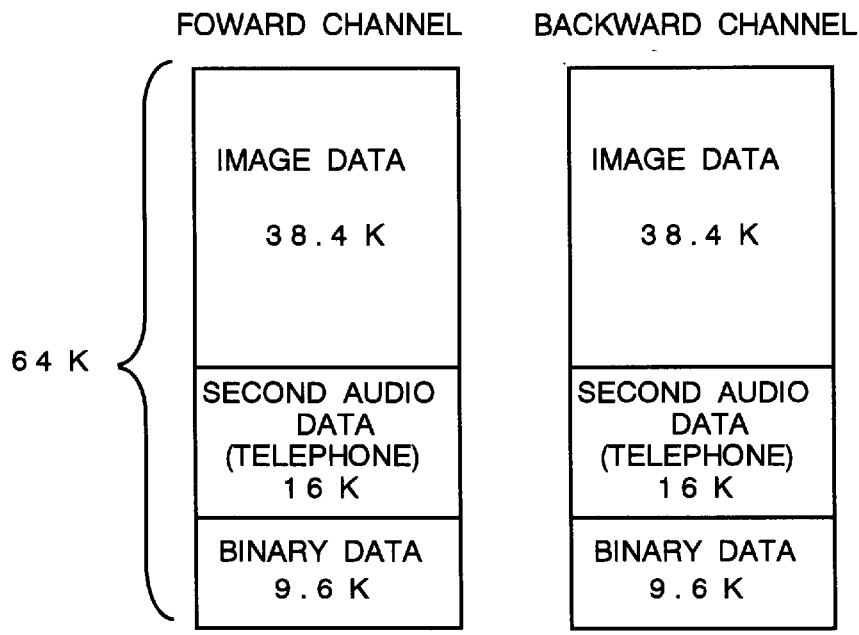
FIG. 5 is a view useful for explaining about the transmission rate of multiplexed data in the real-time transmission mode.
Figure 6:
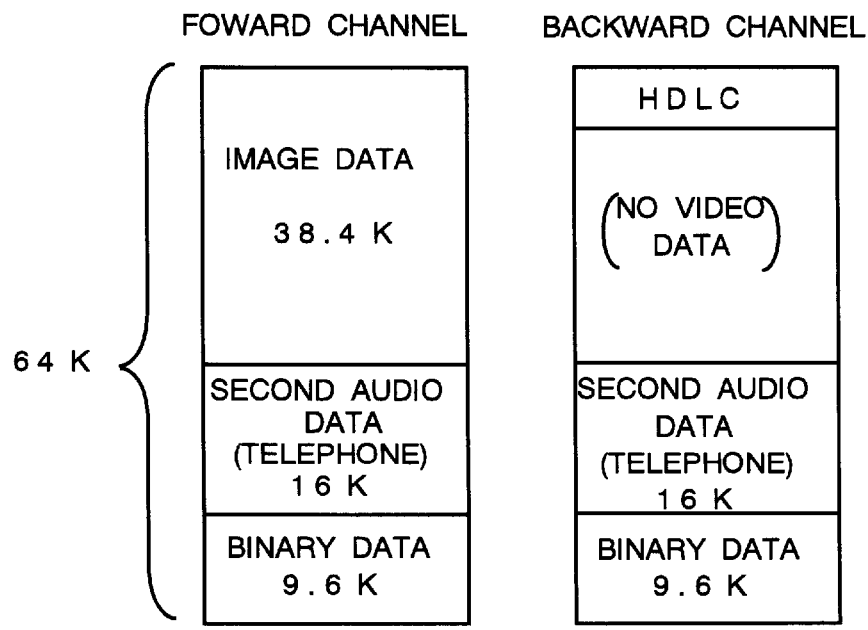
FIG. 6 is a view useful for explaining about the transmission rate of multiplexed data in the storage transmission mode.

FIG. 5 is a view useful for explaining about transmission rate for the multiplexing process, illustrating the transmission rate for each of the forward and backward channels in the real-time transmission mode. As can be seen, for both the forward channel and the backward channel, 38.4 Kbits are assigned to the picture data consisting of the the video data and first audio data, 16 Kbits to the second audio data, and 9.6 Kbits to binary data to be used for controlling video camera or the like; and the total number of bits is 64 Kbits. The picture data include the error correction code.

In the storage transmission mode, the transmission rate for the forward channel is equal to that in FIG. 5, whereas the transmission rate for the backward channel, where no video data occur, includes HDCL answer-back bits for confirmation instead of the bits for the video data. In either transmission mode, 16 Kbps are assigned to the second audio data, or telephone data; thus, telephone service is available even during transmission of video data.

While the present invention has been described and illustrated with respect to a specific embodiment thereof, it is to be understood that the present invention is by no means limited thereto but encompasses various changes and modifications which will become possible without departing from the scope of the appended claims.

What is claimed is:

1. A video transmission apparatus equipped with functions of transmitter-receiver and arranged to effect inputting and outputting of image data consisting of video data and first audio data, and second audio data for realizing telephone function, the improvement comprising:

a video codec for compression-encoding video data to be transmitted and decompression-decoding video data as received; a first audio codec for compression-encoding first audio data to be transmitted and decompression-decoding first audio data as received; a second audio codec for compression-encoding second audio data to be transmitted and decompression-decoding second audio data as received; a multiplexer-demultiplexer for including a three-channel buffer memory and processor; and an interface connectable to communications satellite network and ground network, wherein in the multiplexer-demultiplexer, video data-first audio data and second audio data to be transmitted are multiplexed and converted to a packet based on a predetermined communication format, and packet as received is separated into video data-first audio data, and second audio data.

2. A video transmission apparatus equipped with functions of transmitter-receiver and arranged to effect inputting and outputting of image data consisting of video data and first audio data, and second audio data for realizing telephone function, the improvement comprising:

a video codec for compression-encoding video data to be transmitted and decompression-decoding video data as received; a first audio codec for compression-encoding first audio data to be transmitted and decompression-decoding first audio data as received; a second audio codec for compression-encoding second audio data to be transmitted and decompression-decoding second audio data as received; a multiplexer-demultiplexer for including a three-channel buffer memory and processor; and an interface connectable to communications satellite network and ground network, wherein:

in the multiplexer-demultiplexer, video data-first audio data and second audio data to be transmitted are multiplexed and converted to a packet based on a predetermined communication format, and packet as received is separated into video data-first audio data and second audio data;

at transmitting site, through use of said three-channel buffer memory, flag bit for data discrimination is added to data bit for each of said video data and first audio data and said second audio data; and the data are multiplexed and converted to packet in said processor; and at receiving site, through use of said three-channel buffer memory, said packet is separated into the respective data based on said flag bit in said processor; timing position between the video data and the audio data is adjusted, thereby making possible transmission and reception of second audio data even during transmission of video data and first audio data.

* * * * *